H. F. MARANVILLE.
HEATING APPLIANCE.
APPLICATION FILED MAY 29, 1916.
1,392,071.
Patented Sept. 27, 1921.
2 SHEETS—SHEET 1.
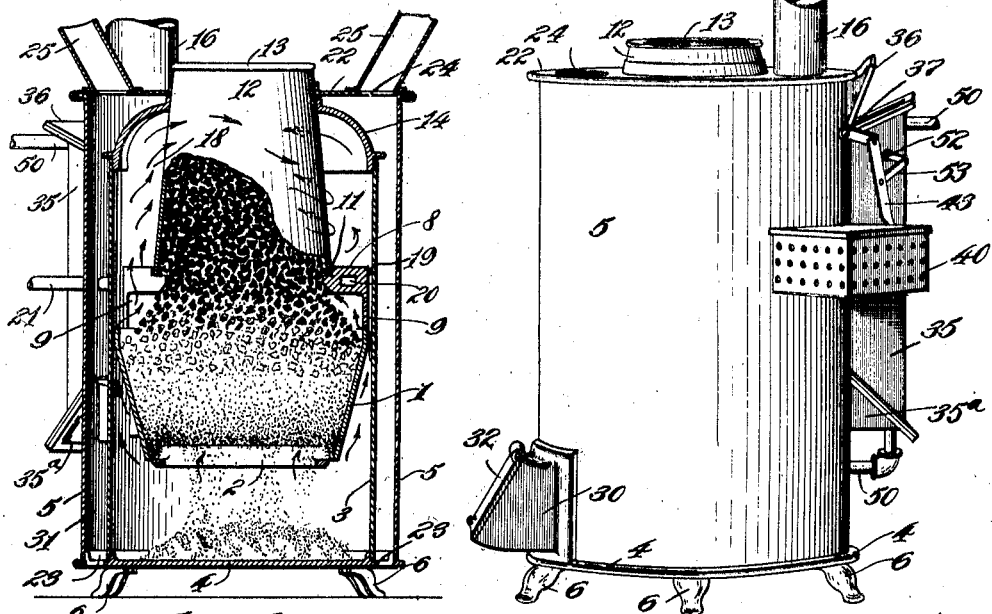
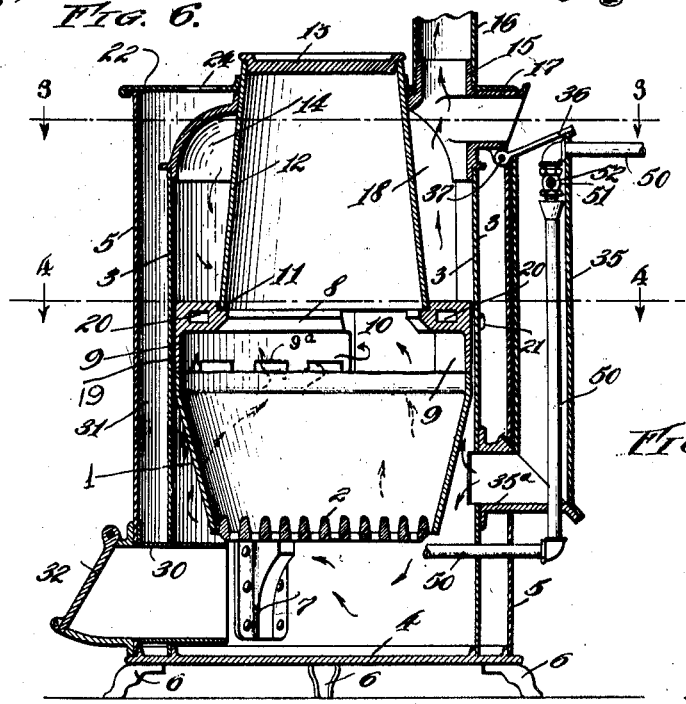
INVENTOR,
Harvey F. Maranville
By Hull, Smith, Brock & West.
Attys.

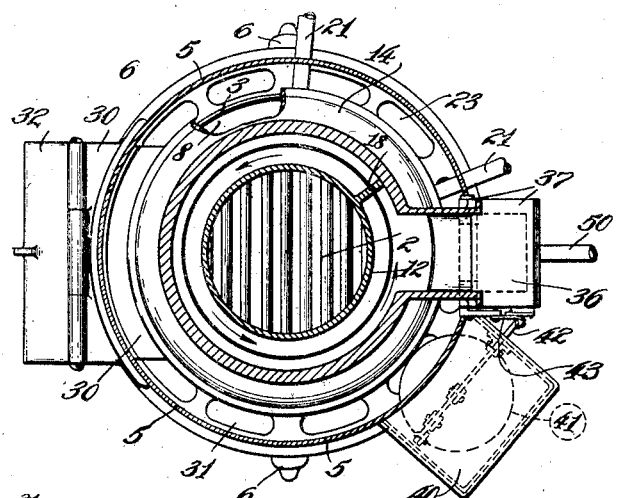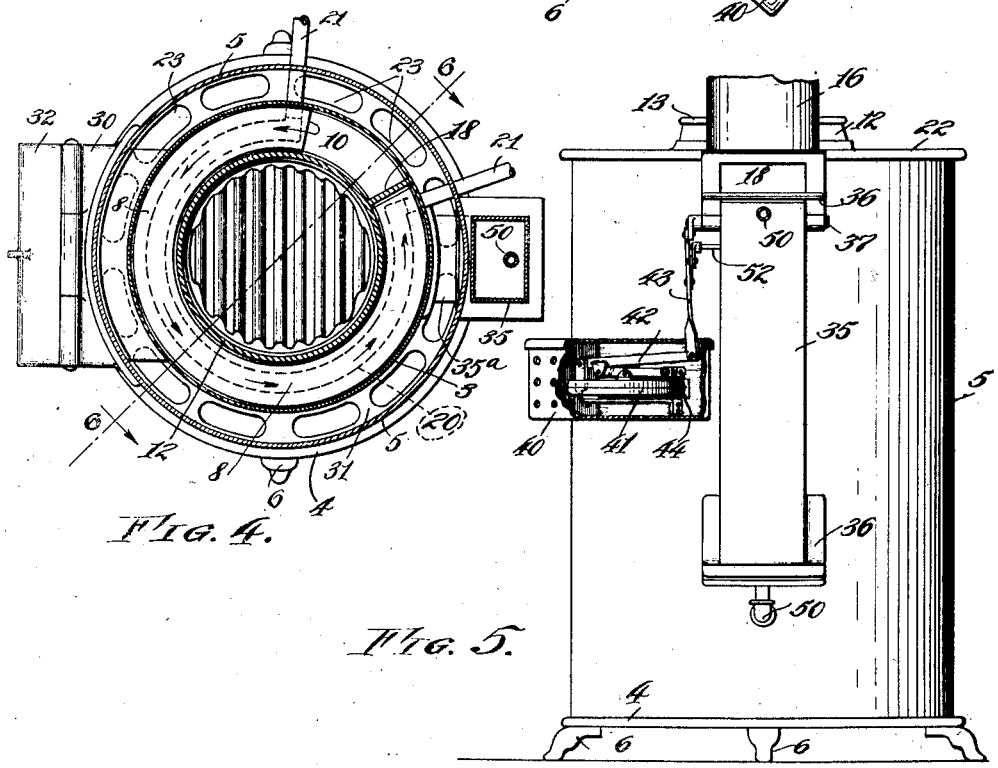

UNITED STATES PATENT OFFICE.

HARVEY F. MARANVILLE, OF AKRON, OHIO.

HEATING APPLIANCE.

1,392,071.  Specification of Letters Patent.  Patented Sept. 27, 1921.

Application filed May 29, 1916. Serial No. 100,457.

*To all whom it may concern:*

Be it known that I, HARVEY F. MARANVILLE, a citizen of the United States, residing at Akron, in the county of Summit and State of Ohio, have invented a certain new and useful Improvement in Heating Appliances, of which the following is a full, clear, and exact description, reference being had to the accompanying drawings.

This invention relates to heating devices and especially to small, simple, compact, cheap, and self-contained appliances which can be used for heating houses, barns, stables, garages, halls, cottages and the like, to be operated by coal, coke, or gas, either intermittently or continuously and with a maximum of convenience and safety. The objects of the invention are the provision of a heater to afford both hot air and hot water, the latter being usable either for heating or washing purposes; the provision of a heater wherein the fire receptacle shall be entirely surrounded by air spaces so as to minimize the chances of igniting surrounding objects; the provision of a fire box of the magazine type in which choking of the flame spaces shall be minimized; the provision of a device wherein all combustion materials are taken in at a distance above the floor; while further objects and advantages will appear as the description proceeds.

In the drawings accompanying and forming a part of this application I have shown one operative structure in which my invention can be embodied, though it will be understood that these drawings are illustrative only and not limiting. In these drawings, Figure 1 is a perspective view of a complete heating appliance constructed in accordance with my invention; Fig. 2 is a vertical central sectional view through the same; Figs. 3 and 4 are horizontal sectional views taken upon the lines 3, 3 and 4, 4 respectively of Fig. 2 and looking downwardly; Fig. 5 represents a rear elevation of my improved heating appliance, a part of the thermostat box being broken away; and Fig. 6 is a vertical sectional view taken on the line 6—6 of Fig. 4 and showing the conditions during combustion.

Describing the parts by reference characters, 1 represents the firebox of my improved heater, and 2 the grate which closes the bottom of the same. This firebox is preferably of an inverted frusto-conical shape arranged with its axis vertical and its larger end uppermost, and is surrounded by a cylindrical sheet metal shell 3 which embraces rather closely its larger end, though leaving a very narrow annular passage 19 for air. The lower end of the shell 3 rests upon a flat circular bottom plate 4, which extends laterally beyond the shell 3 on all sides so as to receive and support a second external cylindrical shell 5 concentric with the inner shell. The plate 4 is supported above the floor by legs 6, 6, and the firebox and grate are suitably supported above this plate as by brackets 7 secured inside the shell 3.

Upon the top of the firebox I place an incomplete cast iron annulus comprising a hollow body 8 projecting inwardly over the firebox and a depending skirt 9 resting on the top of the firebox, the lower edge of such skirt being here shown as formed with occasional notches 9ª for the admission of air, although the natural irregularites of the skirt 9 and firebox 1 will generally afford a degree of air-inlet facility. The body 8 and flange 9 are discontinued at one point to form the opening 10, and the inner edge of the body 8 is formed with a circular rabbet 11 receiving the hollow magazine 12 whose upper end projects above the top of the shell 5 and is closed by the cover 13. The upper end of the shell 3 supports a cover member 14 of annular form, through the opening of which the magazine 12 projects snugly, and one side of this cover 14 is formed with a nipple 15 for the smoke pipe 16 and with a horizontal branch 17 for the check draft. It will therefore be seen that the opening 10 provides a passageway between the interior of the firebox and the annular space between the shell 3 and magazine 12.

The exterior of this magazine carries a radial fin 18 whose edge fits snugly against the shell 3 and cover 14. The body 8 is disposed so that the opening 10 falls just out of vertical alinement with the nipple 15, and the magazine 12 is arranged so that the fin 18 is interposed between this opening and smoke pipe, with the result that the products of combustion are forced to sweep all the way around the magazine 12 before being discharged into the chimney. The body 8 is formed with a passageway 20 therein which communicates with the pipes 21, 21, arranged one on each side of the opening 10, so that water may be heated, and the body 8 cooled against premature destruction. The top of the shell 5 is covered by a metal plate 22 which fits snugly around the magazine 12 and also around the nipple 15, the plate 4 being formed with a plurality of air inlet openings 23, 23 registering with the space between the shells 3 and 5, and the plate 22 being formed with air outlet apertures 24 for the discharge of the heated air. The heated air may be discharged directly into the room as contemplated in Figs. 1 and 2, or pipes 25 can be disposed in communication with the apertures 24 as shown in Fig. 6, so as to convey the heated air wherever required. The water heated in the body 8 can either be conveyed to heating radiators for warming exposed or distant portions of the building, or may be used for heating water for live stock, garage purposes, kitchen use, or the like.

At one side of this heating appliance, preferably the side opposite the smoke pipe 16, a hollow conduit 30 traverses the shells 3 and 5 at a point below the grate 2 so as to give access to the ash pit without establishing communication with the air passage 31 existing between these shells. The outer end of this conduit is provided with a tightly-closing gravity-door 32 which is preferably arranged so as not to be left open, or to be secured open, or to have any openings for draft purposes. This side of the heater will hereafter be called the "front" and the side having the smoke pipe the "rear" in accordance with a well established usage.

The rear of the heater is provided at a point in line with the branch 17 with an upright draft pipe 35, whose lower end communicates through the fitting 35ᵃ with the interior of the shell 3 beneath the firebox, and whose upper end is terminated at a point opposite the end of the branch 17. This arrangement of the draft-pipe and check-branch render possible the control of the same, if desired, by the use of a single valve member, here shown as a flap valve 36 pivoted at 37 and arranged to cover one or the other opening, or to leave both open in the desired proportion, according to its adjustment. It will be understood, however, that I do not confine myself to this method of control or to this location of parts although I have found this extremely simple, convenient, and satisfactory. Also the location of this air inlet at a point so far above the floor renders the heater safe for garage use because of its elevation above the probable level of any material amount of gasolene vapor.

For automatically regulating the amount of heat produced by my device I have illustrated and prefer to employ the thermostat appliance shown in Figs. 1, 3 and 5. In these views I have shown the shell 5 as provided at a point adjacent the draft pipe 35 with a perforated box 40, in which is housed an expansion thermostat 41, connected by means of suitable levers 42 and links 43 with the valve pivot 37. The thermostat body is preferably projected partly through a slot 44 in the side of the shell 5 as shown in Figs. 3 and 5 so as to be subjected both to the heated air passing through the annular air-passage 31 and to the external air entering through the perforations in the box 40, thus continuing the operation of the heater until the external air is warmed sufficiently while preventing a too rapid operation of the heater which might endanger the surroundings.

I have illustrated my improved heating appliance as provided with a gas supply pipe 50 provided with a valve 51 whose stem 52 is connected by the link 53 with the link 43 so as to be operated by the thermostat in the usual manner. I have located the pipe 50 inside the draft pipe 35, so as to secure it firmly in position for transportation, and to maintain the valve 51 in the same position in all installations. In all sections of the country where artificial gas is sufficiently cheap or where natural gas is available, the grate 2 can be replaced with gas burning devices of any suitable well known type and the heater may be employed without any change whatever in other respects, except preferably the filling of the firebox with fire brick or other suitably packed incombustible rubble.

The use of the device with gas is too obvious to require explanation. For use with coal a fire is first lighted in the usual manner and the fire pot is gradually filled up until the magazine 12 is charged with unburned coal as shown in Fig. 6. The angular relation between the body 8 and skirt 9 causes the existence of a space unfilled with coal, and the joint between this skirt and the top of the fire box being purposely left uneven as before mentioned, sufficient fresh air enters at this point to cause a rapid combustion within this space which maintains the desired heat of the body 8. The gases, both consumed and unconsumed, pass outwardly through the opening 10 and sweep around the magazine 12 above described, where they are met by additional air passing upwardly through the narrow passage 19 adjacent to the shell 3 which completes their combustion. The body 8 is therefore heated both above and below so that the temperature of the water therein is raised very rapidly permitting a quick circulation; also the shell 3 is heated at all points, below by radiation from the outside of the firebox and fire ring, and above by direct action of the combustion products, with the result that a device of small size will produce a large amount of heat quickly, or will maintain a low amount of heat over a very long time, thus permitting continuous operation with infrequent attention. I have illustrated no shaking or grate dumping devices, since it will be apparent to those skilled in the art that any suitable appliance may be employed. So far as fundamentals are concerned it is well known that a heater of this nature can be operated by poking alone.

While I have described my invention in detail and have pointed out at length that particular construction and mode of operation which my experience indicates as being most suitable, it will be obvious that many changes in detail could be made without departing from the scope of my invention wherefore I do not limit myself except as defined in the claims hereto annexed or as rendered necessary by the prior art.

Having thus described my invention, what I claim is:—

1. In a device of the character described, a hollow upright shell, a firebox supported within said shell intermediate the top and bottom thereof, an annular body supported above said firebox and overhanging the marginal portion of the same, an upright magazine supported upon said body and spaced at all points from said shell, there being an opening through said body at one point, a cover for the annular space between said shell and magazine, an exit for products of combustion from said annular space, and a partition interposed between said exit and the opening in said body whereby the products of combustion are forced to sweep about said annular space.

2. In a device of the character described, a hollow upright cylindrical shell, an inverted frustoconical firebox supported within said shell intermediate the top and bottom thereof with its larger end uppermost, there being an inwardly projecting member overhanging the marginal portion of the same and the upper end of said firebox being spaced from the shell to form a narrow air passage, an upright magazine supported upon said ledge and spaced at all points from said shell to form an annular chamber, there being an opening through said member between the interior of said firebox and said annular chamber, a draft flue leading from said annular chamber, and a partition interposed between said flue and the opening in said body whereby the products of combustion are forced to sweep about said annular space and over said narrow passage.

3. In a device of the character described, an upright circular shell, a firebox fitting within said shell intermediate of its height, an upright magazine located in said shell above said firebox and spaced from the sides and projecting above the top of said shell, a supporting member resting upon the edge of said firebox and overhanging the margin thereof and meeting the bottom of said magazine, an upright partition extending between said magazine and shell, and a cover for the annular space between said magazine and shell above said partition, said shell being formed for the inlet of air below said firebox, and said supporting member being formed with an opening for products of combustion at one side of said partition and said annular space being provided with an outlet for burned gases upon the opposite side of said partition.

4. In a device of the character described, an upright circular shell, a firebox fitting within said shell intermediate of its height, an upright magazine located in said shell above said firebox and spaced from the sides and projecting above the top of said shell, a hollow supporting member resting upon the edge of said firebox and overhanging the margin thereof and meeting the bottom of said magazine, an upright partition extending between said magazine and shell, water circulating connections for the interior of said supporting member and a cover for the annular space between said magazine and shell above said partition, said shell being formed for the inlet of air below said firebox, and said ring being formed with an opening for products of combustion at one side of said partition and said annular space being provided with an outlet for burned gases upon the opposite side of said partition.

5. In a device of the character described, an upright cylindrical shell, an inverted frusto-conical firebox supported coaxially within said shell and defining with the walls thereof a narrow annular air passage, an annular member of substantially the same external diameter as said firebox and having a depending flange approaching the same closely and forming a narrow air passage, the body of said member projecting inwardly so as to overhang the margin of said firebox, an upright magazine supported upon the innermost portions of said member and spaced from the walls of said shell, a cover for the annular space between said magazine and shell and spaced above said member, a smoke pipe communicating with said annular space, and means for delivering atmospheric air into the portion of said shell beneath said firebox, said annular member having an opening therein whereby the interior of said firebox is placed in communication with said annular space, said annular member being hollow, and water connections to said annular member.

6. In a device of the character described, an upright cylindrical shell, an inverted frusto-conical firebox supported coaxially within said shell and defining with the walls thereof a narrow annular air passage, an annular member of substantially the same external diameter as said firebox and having a depending flange approaching closely thereto and defining therewith a narrow air passage, the body of said member projecting inwardly so as to overhang the margin of said firebox, an upright magazine supported upon the innermost portions of said member and spaced from the walls of said shell, a cover for the annular space between said magazine and shell and spaced above said member, a smoke pipe communicating with said annular space, means for delivering atmospheric air into the portion of said shell beneath said firebox, said member having an opening therein whereby the interior of said firebox is placed in communication with said annular space, and a partition in said annular space between said opening and smoke chimney whereby the products of combustion are caused to take a circuitous path.

In testimony whereof, I hereunto affix my signature.

HARVEY F. MARANVILLE.